United States Patent Office 3,627,509

Patented Dec. 14, 1971

3,627,509
METHOD OF PREPARING A MAGNETICALLY STABLE METAL POWDER CONSISTING MAINLY OF IRON AND MEANT FOR MAGNETIC RECORDING

Aart Antonie van der Giessen, and Cornelis Johannes Klomp, Emmasingel, Eindhoven, Netherlands, assignors to U.S. Philips Corporation, New York, N.Y.

No Drawing. Filed Apr. 1, 1970, Ser. No. 24,822
Claims priority, application Netherlands, Apr. 8, 1969, 6905417
Int. Cl. B22f 9/00
U.S. Cl. 75—.5 AA 3 Claims

ABSTRACT OF THE DISCLOSURE

The invention relates to a method of preparing metal powders mainly consisting of iron and meant for magnetic recording by reduction of an iron oxide or an iron oxide hydrate and is characterized in that a measured quantity of silver is previously deposited on the material to be reduced. As a result of this the reduction speed is also considerably increased so that the reduction occurs at speeds which can be used in practice also at temperatures lower than those at which sintering of the formed metal particles which is disturbing for the application in view takes place.

The invention relates to a method of preparing a magnetically stable metal powder consisting mainly of iron and meant for magnetic recording. A "magnetically stable metal powder" is to be understood to mean herein a powder of which the saturation magnetisation, after the powder has been exposed to the atmospheric air for 24 hours, is still at least 90% of the value measured immediately after the preparation of the powder. Such magnetically stable powders are obtained, for example, by "stabilizing" the freshly prepared powders, that is to say by dipping them in a suitable chosen organic liquid, for example, dioxane, acetone or ethanol, and then taking them out of the liquid and removing the adhering liquid.

Fine iron powders as a material for magnetic recording are known. It has already been proposed to prepare such powders by electrolysis of ferrous salt solutions while using a mercury cathode. The cost involved in the use of said method on a technical scale is considerable. It is furthermore known to prepare iron powders by reduction of finely divided oxide hydrate by means of hydrogen or another gaseous reduction agent. In order to carry out the reduction at a speed which can be used in practice, it must be carried out at temperatures above 350° C. The drawback of this is, however, that the formed metal particles sinter together so that a product is formed which is not suitable or is at least readily suitable as a material for magnetic recording.

According to the invention, the duration of the reduction of finely divided iron oxide, or finely divided iron oxide hydrate, by means of a gaseous reduction agent of iron powder which is suitable as a material for magnetic recording can be considerably shortened so that the process occurs at a speed which can be used in practice also at temperatures lower, and sometimes even considerably lower, than 350° C. The method according to the invention is characterized in that prior to the reduction at least one silver compound and/or metallic silver is deposited on the iron oxide or iron oxide hydrate to be reduced in such a quantity that the metal powder obtained subsequently by reduction contains more than 0.5 and less than 150 silver atoms per 1000 iron atoms.

In order to effect that (a) silver compound(s) deposit(s) on the finely divided iron oxide or finely divided iron oxide hydrate to be reduced, the material to be reduced is suspended for example in a liquid in which said silver compound(s) is (are) dissolved. The liquid in question may be, for example, an organic solvent, for example, ethanol or acetone, in addition to water. The liquid is then preferably removed by evaporating it so that the material to be reduced on which the silver compound(s) has (have) deposited, remains. In this manner it is achieved that the whole quantity of silver compound(s) dissolved in the liquid is deposited on the powder to be reduced so that the silver content of the metal powder obtained by reduction need afterwards no longer be determined by analysis.

According to another method in which the material to be reduced is also suspended in a solution of at least one silver salt, the liquid is separated from the solid by centrifuging or filtering. The silver content of the metal powder obtained by reduction can then be determined by analysis, if desirable.

It is alternatively possible to suspend the powder to be reduced in a solution of a complex silver compound and to add subsequently to the suspension a reduction agent, for example, formaldehyde, after which the silver formed by the reduction deposits from the liquid on the iron oxide (hydrate) to be reduced which is then separated from the liquid.

Another method is that the powder to be reduced is suspended in a colloidal silver solution (silver sol), the sol is then caused to flocculate and the liquid is separated from the material to be reduced by evaporation, centrifuging or filtering.

During the reduction with the gaseous reduction agent (usually hydrogen gas) of the iron oxide (hydrate) pretreated according to the invention with (a) silver compound(s) to iron, the silver compound(s) is (are) decomposed while forming silver which deposits on the iron particles.

The invention will now be described in greater detail, with reference to a few examples. In the experiments to be described, dry hydrogen (that is to say hydrogen having a water content lower than 0.001% by weight) was led at a rate of 940 cm.$^3$ per minute over quantities of 150 mgms. of the material to be reduced until the gas flowing out of the reaction space contained less than 0.004% by weight of hydrogen. The metal powders formed were then stabilized by keeping them immersed in dioxane for 30 minutes and then separating them from the liquid and drying them.

The characteristic quantities most important for the usability of the material for magnetic recording purposes were measured of the resulting metal powders, namely the coercive force $(\mu_0 \times {}_I H_c) \times 10^4$, expressed in v. sec. m.$^2$ and the remanence $(\delta_r \times 10^4)$ expressed in v. sec. m./kgm.

EXAMPLE I

Five portions of 5 grams of an α-FeOOH powder consisting of acicular particles, approximately 2 microns long, approximately 0.4 micron thick, were each suspended in one of five solutions of different quantities of silver nitrate, in 100 ccm. of ethanol. The ethanol was then evaporated. The quantities of silver nitrate in the solutions in question were 0.040, 0.0848, 0.1707, 0.4297 and 0.8535 gm., respectively. These quantities were chosen to be so that the metal powders obtained by the subsequent reduction of the α-FeOOH pretreated with the silver nitrate solutions in question contained 4.5, 9, 18, 45 and 90 silver atoms, respectively, per 1000 iron atoms.

Of each of the portions of solid remaining after evaporation of the ethanol, 150 mgms. were reduced in the above-described manner. The reduction temperature was 350° C. For comparison, a quantity of 150 mgms. of the α-FeOOH in question pretreated with ethanol which contained no silver nitrate was reduced in the same manner, so also at 350° C. (so-called "blank experiment"). In the Table A below the resulting measured results are stated. The reduction times are expressed in percent of the reduction time measured in the blank experiment which was 38 minutes.

TABLE A

| Silver atoms per 1,000 iron atoms in the reduced material (the metal powder) | Reduction time expressed in percent of that measured in the blank experiment | $(\mu_0.IH_c) \times 10^4$ (in v. sec./m.$^2$) | $\delta \times 10^4$ (in v. sec. m./kg.) |
|---|---|---|---|
| | 100 | 525 | 0.89 |
| 4.5 | 92 | 490 | 0.81 |
| 9 | 82 | 500 | 0.82 |
| 18 | 82 | 475 | 0.87 |
| 45 | 79 | 615 | 0.84 |
| 90 | 74 | 615 | 0.78 |

From this table it may be seen that by using the method according to the invention the reduction time was reduced rather considerably while maintaining the critical magnetic quality values.

EXAMPLE II

Five portions of 150 mgms. of an α-FeOOH powder having particles as described in Example I, were reduced in the above-described manner by means of hydrogen but at different reduction temperatures, namely at 350° C., 325° C., 300° C., 275° C., 250° C. and 220° C. (blank experiments), respectively. Furthermore 5 gms. of this α-FeOOH powder were suspended in a solution of 0.085 gm. of silver nitrate in 100 cm.$^3$ of ethanol The ethanol was evaporated Of the resulting solid, 6 portions of 150 mgms were reduced in the above-described manner, the first portion at 350° C, the second at 325° C, the third at 300° C, the fourth at 275° C, the fifth at 250° C and the sixth at 220° C. The resulting measured results are stated in the following Table B.

TABLE B

| | Blank experiment | | | 9 silver atoms per 1,000 iron atoms in the reduced material | | |
|---|---|---|---|---|---|---|
| Reduction temperature (in ° C.) | $(\mu_0 \cdot {}_IH_c) \times 10^4$ (in v. sec./m.$^2$) | $\delta_r \times 10^4$ (in v. sec. m./kg.) | Reduction time [1] (in minutes) | $(\mu_0 \cdot {}_IH_c) \times 10^4$ (in v. sec./m.$^2$) | $\delta_r \times 10^4$ (in v. sec./m.$^2$) | Reduction time [2] |
| 350 | 525 | 0.89 | 38 | 500 | 0.82 | 82 |
| 325 | 565 | 0.93 | 47 | 630 | 0.96 | 79 |
| 300 | 660 | 0.99 | 67 | 705 | 0.90 | 67 |
| 275 | 695 | 1.02 | 105 | 725 | 0.97 | 57 |
| 150 | 745 | 1.00 | 325 | 765 | 0.95 | 38 |
| 220 | 760 | 1.01 | 1,400 | 795 | 0.95 | 15 |

[1] In minutes.
[2] In percent of that measured in the corresponding blank experiment.

It appears from this table that the reduction time was shortened again while maintaining the critical magnetic quality values. This phenomenon was even more emphasized according as a lower reduction temperature was used. The method according to the invention therefore enables the reduction to be carried out at a rate which can be used for practical purposes also at temperatures at which sintering of the metal particles obtained by the reduction takes place only to a very slight extent.

EXAMPLE III

A quantity of 5 gms. of the same α-FeOOH powder described in Example I was suspended in a solution of 0.008 gms. of silver nitrate and 100 gms. of ethanol. The ethanol was evaporated. A quantity of 150 mgms. of the remaining solid was reduced in the above-described manner at a temperature of 275° C. The reduction time was now 67% of the reduction time in the corresponding blank experiments which was 105 minutes (see Table B, Example II). The resulting product (which contained 0.9 atom of silver per 1000 iron atoms) had a coercive force $(\mu_0 \cdot {}_IH_c) \times 10^4$ of 740 v. sec./m.$^2$ and a remanence $(\delta_r \times 10^4)$ of 1.00 v. sec. m./kgm.

EXAMPLE IV

Starting material was a powder of acicular particles approximately 0.5 micron long, approximately 0.1 micron thick, consisting of tin-containing α-FeOOH. This powder was prepared as follows: 33.6 gms. of $FeSO_4.7H_2O$ were dissolved in 168 cm.$^3$ of distilled water. Furthermore, 56 gms. of NaOH were dissolved in 280 cm.$^3$ of distilled water and this solution was cooled to room temperature. A solution of 0.27 gm. of $SnCl_2.2H_2O$ and 10 cm.$^3$ of distilled water was also prepared and brought at a pH of well over 13 by the addition of sodium hydroxide solution. The said NaOH solution was added, while stirring, to the said $FeSO_4$ solution after which the $SnCl_2$ solution was added to the resulting mixed solution. Air at a rate of 5 litres per minute was led through the resulting suspension of ferrous hydroxide at room temperature for 24 hours. The resulting precipitate of iron oxide hydrate was washed until the pH of the wash water had the value 6. Then the precipitate was rinsed three times with acetone and dried in air. The atomic ratio Sn/Fe of the resulting powder was 0.006.

150 mgms. of the above-mentioned powder were reduced in the above-described manner by means of hydrogen at a temperature of 275° C. (blank experiment). The reduction time was 128 minutes. The resulting metal powder had a coercive force $(\mu_0 \times {}_IH_c) \times 10^4$ of 1070 v. sec./m.$^2$ and a remanence $(\delta_r \times 10^4)$ of 1.03 v. sec. m./kgm.

5 gms. of the above-mentioned tin-coating α-FeOOH powder were suspended in a solution of 0.085 gm. of silver nitrate in 100 gms. of ethanol. The ethanol was evaporated. A quantity of 150 mgs. of the remaining solid was reduced in the above-described manner also at 275° C. as in the corresponding blank experiment. The reduction time was 62% of that required in the blank experiment. The resulting metal powder which contained 9 silver atoms per 1000 iron atoms had a coercive force $(\mu_0 \times {}_IH_c) \times 10^4$ of 1060 v. sec./m.$^2$ and a remanence $(\delta_r \times 10^4)$ of 0.98.

EXAMPLE V

Starting material was a powder of $\gamma$-$Fe_2O_3$ in the form of acicular particles, approximately 1 micron long, approximately 0.2 micron thick. 150 mgms. of this powder were reduced in the above-described manner at a temperature of 275° C. (blank experiment). Furthermore 5 gms. of the $\gamma$-$Fe_2O_3$ powder were treated in the manner as described in Example IV in relation to the tin-containing α-FeOOH powder with a solution of 0.084 gm. of silver nitrate in 100 gms. of ethanol, after which 150 mgms. of the remaining solid were reduced in the above-described manner by means of hydrogen at a temperature of 275° C. as in the corresponding blank experiment. The reduction time in the blank experiment was 1400 minutes, while the reduction time of the $\gamma$-$Fe_2O_3$ pretreated with the silver nitrate solution was only 19% of that required in the blank experiment. The metal powder obtained in the blank experiment had a coercive force $(\mu_0 \cdot {}_IH_c) \times 10^4$ of 650 v. sec./m.$^2$ and a remanence $(\delta_r \times 10^4)$ of 0.81 v. sec. m./kgm.). Values of 680 v. sec./m.$^2$ and 0.82 m./kgm., respectively, were measured in the metal powder obtained by the reduction of the $\gamma$-$Fe_2O_3$ pretreated with the silver nitrate solution which powder contained 8 silver atoms per 1000 iron atoms.

EXAMPLE VI

Starting material was a powder of $Fe_3O_4$ in the form of acicular particles, 1 micron long, 0.2 micron thick. In the same manner as described in Example V with respect to a $\gamma$-$Fe_2O_3$ powder, the properties were compared of on the one hand a metal powder, obtained by directly reducing 150 mgms. of the $Fe_3O_4$ powder in question, so without pretreatment, at a temperature of 275° C. (blank experiment) and on the other hand of a metal powder obtained by reduction at the same temperature of 150 mgms. of the $Fe_3O_4$ powder pretreated in the manner described in Example V with a solution of 0.085 gm. of silver nitrate in 100 gms. of ethanol. The reduction time in the blank experiment was 345 minutes and the resulting metal powder had a coercive force $(\mu_{0\cdot I}H_c)\times10^4$ of 455 v. sec./m.$^2$ and a remanence $(\delta_r\times10^4)$ of 0.64 v. sec. m./kgm. The time of the reduction of the pretreated $Fe_3O_4$ powder was 50% of that required in the blank experiment. The resulting metal powder which contained 7.5 silver atoms per 1000 iron atoms had a coercive force $(\mu_{0\cdot I}H_c)\times10^4$ of 475 v. sec./m.$^2$ and a remanence $(\delta_r\times10^4)$ of 0.68 v. sec. m./kgm.

EXAMPLE VII 9.37 gms. of silver nitrate were dissolved in 120 cm.$^3$ of demineralized water. 130 cm.$^3$ of a 2 molar $NH_4OH$ solution were added to the solution after which the whole was stirred until the initially formed precipitate had dissolved again. Then another 210 cm.$^3$ of demineralized water were added. The volume of the resulting solution ("solution a") was approximately 460 cm.$^3$.

5 cm.$^3$ of "solution a" were made up to a volume of 500 cm.$^3$ by the addition of 495 cm.$^3$ of demineralized water so 100 times diluted. In the diluted solution 4.33 gms. of a powder of $\alpha$-FeOOH consisting of acicular particles, 1 micron long, 0.1 micron thick, were suspended. 0.39 cm.$^3$ of a solution prepared by mixing 36 cm.$^3$ of a 37% by weight solution of formaldehyde in water, and 3 cm.$^3$ of triethanolamine were added to the suspension after which the whole was left to stand for 5 minutes. Nearly all the silver formed by the decomposition of the silver compound dissolved in the liquid had then deposited on the $\alpha$-FeOOH likewise separated from the suspension. The $\alpha$-FeOOH was then separated by centrifuging the liquid, then washed with acetone, and dried in air. A quantity of 150 mgms. of the resulting dry powder (denoted as "powder-$\alpha$," in Table C below) was reduced in the above-described manner with hydrogen at a temperature of 350° C.

A quantity of 4.33 gms. of the same $\alpha$-FeOOH powder consisting of particles, 1$\mu$ long, 0.2$\mu$ thick, was suspended in an analogous manner in 500 cm.$^3$ of a liquid obtained by diluting 50 cm.$^3$ of the above-mentioned "solution a" by the addition of 450 cm.$^3$ of demineralized water 10 times, so to a volume of 500 cm.$^3$, after which 3.9 cm.$^3$ of the above-mentioned mixture of 36 cm.$^3$ of a 37% by weight solution of formaldehyde with water and 3 cm.$^3$ of triethanolamine was added to the suspension. After 5 minutes again all the silver formed by the decomposition of the silver compound dissolved in the liquid had deposited on the $\alpha$-FeOOH likewise separated from the suspension. The $\alpha$-FeOOH was again separated from the solution by centrifuging, washed with acetone and dried in air. Of this powder also (denoted as "powder-$\alpha_2$" in the following Table C) a quantity of 150 mgms. was reduced with hydrogen at the temperature of 350° C. in the above-described manner.

A quantity of 150 mgms. of the non-pretreated, so silver-free, $\alpha$-FeOOH powder consisting of acicular particles, 1 micron long, 0.2 micron thick, was also reduced in the same manner at 350° C. with hydrogen (blank experiment). The reduction time was 34 minutes.

From the "powder-$\alpha_1$" a metal powder was obtained by the reduction, which powder contained 12 silver atoms per 1000 iron atoms, while the "powder-$\alpha_2$" yielded a metal powder by the reduction having 120 silver atoms per 1000 iron atoms.

The measured results obtained in the three metal powders in question are recorded in the following Table C.

TABLE C

| Metal powder obtained by reduction of— | Number of silver atoms per 1,000 iron atoms | Reduction time [1] | $(\mu_{0\cdot I}H_c)\times10^4$ (in V. sec./m$^2$) | $\delta_r\times10^4$ (in V. sec. m./kg.) |
|---|---|---|---|---|
| Non-pretreated $\alpha$-FeOOH (blank experiment) | | 100 | 445 | 0.60 |
| "Powder-$\alpha_1$" | 12 | 74 | 565 | 0.57 |
| "Powder-$\alpha_2$" | 120 | 74 | 500 | 0.53 |

[1] In percent of that measured in the blank experiment.

What is claimed is:

1. A method of preparing a magnetically stable metal powder consisting mainly of iron and suitable for magnetic recording, comprising the steps of reducing a finely divided iron compound selected from one member of the group consisting of iron oxide and iron oxide hydrate with a gaseous reducing agent at a temperature not exceeding 350° C., stabilizing the reduced powder, wherein one member selected from the group consisting of at least one silver compound, metallic silver or admixtures thereof is deposited on said iron oxide or iron oxide hydrate prior to reduction in such a quantity that the subsequently reduced metal powder contains more than 0.5 and less than 150 silver atoms per 1000 iron atoms.

2. A method as claimed in claim 1, wherein the material to be reduced is suspended in a solution of at least one silver salt, after which the solvent is evaporated.

3. A method as claimed in claim 1, wherein hydrogen is used as the gaseous reduction agent.

References Cited

UNITED STATES PATENTS

| | | | |
|---|---|---|---|
| 2,660,522 | 11/1953 | Marquaire | 75—0.5 AA |
| 2,879,154 | 3/1959 | Campbell | 75—0.5 BA |
| 2,967,794 | 1/1961 | Coxe | 75—0.5 BA |

L. DEWAYNE RUTLEDGE, Primary Examiner

G. K. WHITE, Assistant Examiner

U.S. Cl. X.R.

75—0.5 BA; 148—105